No. 877,063. PATENTED JAN. 21, 1908.
W. F. & L. P. EDES.
AUTOMATIC BALL COCK.
APPLICATION FILED JULY 12, 1906.

WITNESSES
A. T. Palmer
H. M. Kelso.

INVENTORS
William F. Edes
Louis P. Edes
by Richard P. Elliott
Attorney

UNITED STATES PATENT OFFICE.

WILLIAM F. EDES, OF LYNN, AND LOUIS P. EDES, OF CAMBRIDGE, MASSACHUSETTS.

AUTOMATIC BALL-COCK.

No. 877,063.          Specification of Letters Patent.          Patented Jan. 21, 1908.

Application filed July 12, 1906. Serial No. 325,754.

*To all whom it may concern:*

Be it known that we, WILLIAM F. EDES, of Lynn, county of Essex, Commonwealth of Massachusetts, and LOUIS P. EDES, of Cambridge, county of Middlesex, Commonwealth of Massachusetts, citizens of the United States, have invented certain new and useful Improvements in Automatic Ball-Cocks, of which the following is a specification, reference being had to the drawings which accompany the same.

Our invention relates to automatic ball cocks, and is particularly adapted for use in controlling the flow of water into the flushing tanks of water closets.

The object of our invention is to produce a ball cock wherein the pressure of water upon the ball valve will tend to close it.

Another object of our invention is to so arrange the ball valve and seat and the device for operating the ball valve that a small movement of said operating device will quickly raise the ball valve to its full height, and will close it again as quickly.

Figure 1:
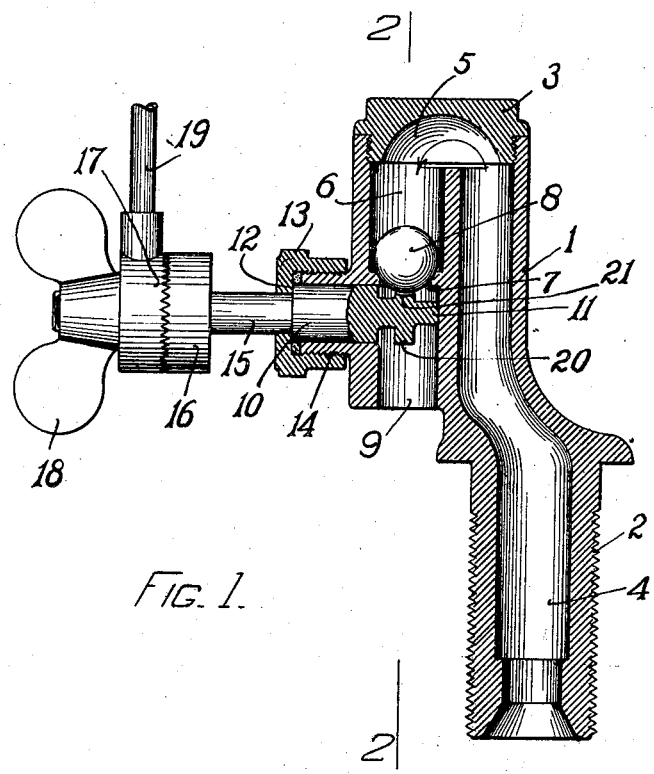
Figure 2:
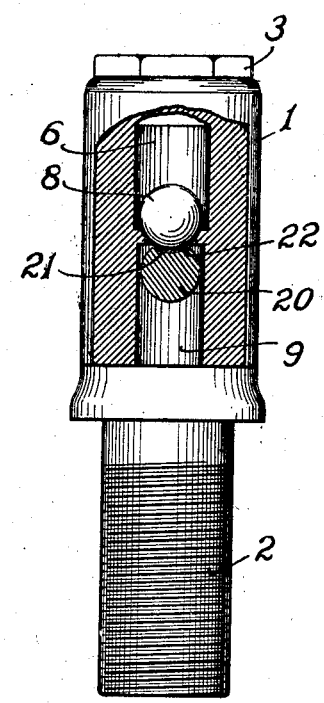
Figure 3:
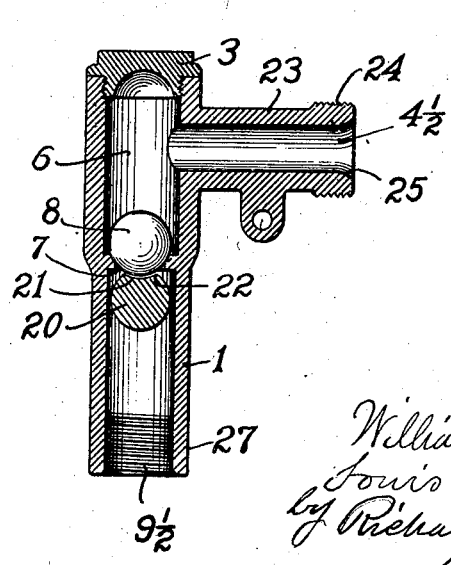

In the drawings accompanying this specification—Figure 1 is a sectional side elevation of our improved ball cock. Fig. 2 is a sectional elevation through line 2—2, Fig. 1. Fig. 3 is a sectional elevation of the modified form of our improved ball cock, wherein the water is caused to flow into the same through the side.

The body of the ball cock is represented by the numeral 1 and is provided with the screw threaded portion 2 for attaching it to the tank or whatever apparatus with which it may be used; 3 is a screw threaded cap hollowed as indicated at 5, secured in the top of the part 1.

4 is a water passage through which the water flows upward as indicated by the arrow upon the top of the ball-cock; 6 is the water passage leading to the valve opening 7; 8 is the ball valve designed to close the opening 7; and 9 is the outlet for the water flowing through the passage 6 and the valve 7.

10 is the ball valve operating device which has a bearing in the side of the body part 1 and is provided with the small portion 11 adapted to abut against one side of the passage 9 and the shoulder 12 which abuts against the inside of the stuffing box 13, the box 13 being screw threaded as at 14 upon the outer surface of the bearing.

15 is a stem having attached to it a collar 16 serrated upon its outer face; 17 is a collar which fits upon the outer end of the stem 15 and has serrated faces to contact with the serrations on the collar 16; 18 is a thumb nut threaded upon the outer end of the stem 15 and is adapted to keep the collar 17 in contact with the collar 16, the serrations being provided to prevent said collars 16 and 17 slipping upon each other, and to provide for adjusting the stem 19 up or down as is found necessary; the stem 19 being designed to receive a ball-float which will float upon the surface of the water in a flushing-tank, and as it rises or falls, open the ball-valve 8 through a shoulder on the collar 20.

The collar 20 is provided with the circular recess 21 shaped to fit the surface of the ball 8, the surface of the recess 21 being adjusted slightly away from the surface of the ball 8 so that said ball-valve 8 will seat upon the seat 7 when closed. When opened, the corner 22 of the portion 20 will contact with the ball and quickly raise it to its full height by slightly revolving the stem 15. This insures the quick opening and closing of the valve.

In the modified form shown in Fig. 3, the stem and operating device is identically the same as that shown in Figs. 1 and 2. An inlet passage 4½ is provided, which leads directly into the down-flow passage 6. Said side inlet is provided with the projecting portion 23 screw-threaded at 24 and tapering on the inner edge at 25 to receive the union coupling and nut. The lower end of the outlet 9½ is provided with screw threads with which to attach it to standard size piping.

Having described our invention, what we claim is—

1. An automatic ball-cock having an inlet and outlet passage, the inlet passage leading to the top of a ball-valve; a ball-valve; a valve opening device consisting of a rotatable stem provided with a circular disk mounted thereon; a concaved recess in said disk, said recess being formed and arranged so that the angle of the ends of said recess with the periphery of the disk will contact with, and quickly raise and lower the ball-valve.

2. The combination in an automatic ball-valve of a body part having an inlet and outlet passage, the inlet passage leading to the top of the ball-valve; a ball-valve; a seat for same; a ball-lifting device comprising a rotatable stem having a circular disk provided with a concaved recess therein, said concaved recess being formed and arranged so that the angle formed by the ends of the recess and periphery of the disk will quickly lift the ball-valve a predetermined distance and as quickly permit the same to close upon rotation of said disk; and an adjustable float on the stem for controlling the flow of water.

In witness whereof, we have hereunto set our hands, in the presence of two subscribing witnesses, this the 15th day of June, A. D. 1906.

WILLIAM F. EDES.
LOUIS P. EDES.

Witnesses:
R. P. ELLIOTT,
H. M. KELSO.